(12) United States Patent
Nagaya et al.

(10) Patent No.: US 6,663,733 B2
(45) Date of Patent: Dec. 16, 2003

(54) RESIN FORMED PRODUCT AND METHODS AND DEVICES FOR MAKING THE SAME

(75) Inventors: Tamotsu Nagaya, Toyota (JP); Mitsuharu Aoyama, Toyota (JP); Kouichi Oshitani, Toyota (JP); Shinji Tomita, Aichi-ken (JP); Shigenori Hirota, Toyota (JP)

(73) Assignee: Araco Kabushiki Kaisha, Toyota (JP)

( * ) Notice: Subject to any disclaimer, the term of this patent is extended or adjusted under 35 U.S.C. 154(b) by 0 days.

(21) Appl. No.: 09/902,487

(22) Filed: Jul. 10, 2001

(65) Prior Publication Data

US 2002/0089098 A1 Jul. 11, 2002

(30) Foreign Application Priority Data

Jul. 11, 2000 (JP) ........................................ 2000-210022
Jul. 11, 2000 (JP) ........................................ 2000-210034
May 11, 2001 (JP) ........................................ 2001-142180

(51) Int. Cl.[7] ............................. B29C 47/04; B29C 47/52
(52) U.S. Cl. ................ 156/79; 156/244.22; 156/244.25; 156/244.27; 156/500
(58) Field of Search .................. 156/244.11, 244.22, 156/244.27, 500, 244.25, 78, 79; 425/382.3

(56) References Cited

U.S. PATENT DOCUMENTS

| 3,481,818 | A | * | 12/1969 | Wellen ........................ 428/161 |
| 4,137,023 | A | * | 1/1979 | Moked et al. ................. 418/15 |
| 5,393,536 | A | * | 2/1995 | Brandt et al. ................ 425/112 |
| 5,478,516 | A | * | 12/1995 | Malm et al. ................. 264/146 |
| 5,776,281 | A | * | 7/1998 | Evans .................... 156/244.17 |
| 6,206,994 | B1 | * | 3/2001 | Shieh et al. ................ 156/172 |

* cited by examiner

Primary Examiner—Jeff H. Aftergut
Assistant Examiner—Barbara J Musser
(74) Attorney, Agent, or Firm—Patterson, Thuente, Skaar & Christensen, P.A.

(57) ABSTRACT

A granular, ground filler of plant origin, such as kenaf fiber, is mixed into a synthetic resin to form a melted synthetic resin Ca, which is extruded from an output port 36 of a low-pressure extruder 30 as an intermediate resin layer C. A first coating material A and a second coating material B are superimposed on the two surfaces of the intermediate resin layer C. Thereafter, both coating materials A and B are pressed and adhered to the melted intermediate resin layer C by a roller press 50.

24 Claims, 7 Drawing Sheets

RESIN FORMED PRODUCT AND METHODS AND DEVICES FOR MAKING THE SAME

BACKGROUND OF THE INVENTION

1. Field of the Invention

The invention relates to techniques for manufacturing resin based products and more particularly relates to resin products containing filler having a relatively low specific gravity, which resin products are useful to form plate- or sheet-like products that may be utilized in vehicles.

2. Description of Related Art

Japanese Laid-open Patent Publication No. 05-245962 discloses a general technique for continuously manufacturing a synthetic resin laminate plate using a synthetic resin mixed with a filler. This technique utilizes an extrusion formation method that employs a T die. The filler that is mixed into the synthetic resin in this known method may be an inorganic or organic substance. When talc, calcium carbonate, or a similar inorganic substance is used as the filler in such an extrusion formation method, the product quality is satisfactory, but the specific gravity (density) of the resulting material is relatively high. Therefore, the weight of products made from such resin materials is also relatively high. When sawdust or another such organic filler substance is used as the filler, the sawdust is finely pulverized or carbonized at the time of extrusion, and the specific gravity (density) of the resulting material consequently does not decrease. Therefore, the weight of products made from such resin materials does not decrease. In addition, moisture contained in the sawdust evaporates during the manufacturing process and results in a decreased product quality. Moreover, increasing the amount of sawdust added to the resin reduces the adherence of the melted resin. Therefore, it has always been difficult to continuously form useful resin products employing such extrusion techniques.

Techniques for continuously manufacturing a plate- or sheet-like formed product are also known in which a synthetic resin containing a resin material or rubber material is melted. In such techniques, the melted material is pressure joined and then cooled to produce a solid synthetic resin product. If a laminate product will be manufactured using, for example, a melted resin material and a coating material, the melted resin material is dropped directly onto the coating material, and then the melted resin material is covered with another coating material. The resin material is pressure joined on both sides to the coating materials and cooled to yield a synthetic resin product having a laminate construction. This method, however, is problematic in that temperature differences between the two surfaces of the resin material at the time that the coating materials are joined to the melted resin material result in differential contraction as well as warping and distortion at the time of cooling. The resin material may, for example, contract due to faster cooling on the surface of the side that is kept at a higher temperature during the pressure joining step.

SUMMARY OF THE INVENTION

It is, accordingly, one object of the present invention to teach effective techniques for producing a high quality resin product.

The resin formed product may, for example, be formed by laminating a surface resin layer onto an intermediate resin layer that comprises a resin. The intermediate resin layer preferably comprises a granular ground substance of plant origin. In addition, air is preferably incorporated into the interior of the melted resin, when it is melted by stirring using a stirring device such as a blade. Preferably, a ground plant product having a specific gravity (density) less than the specific gravity (density) of the resin is mixed into the intermediate resin layer in order to reduce specific gravity (density) of the intermediate resin layer. Thus, the weight of the resin product will be less than if the ground plant product was not utilized. If the intermediate resin layer has a porous quality, a further reduction in weight of the resin product is possible.

A foaming agent is preferably mixed into the melted resin that will become the intermediate resin layer in addition to the ground substance of plant origin. The gas released by the foaming agent increases the porous nature of the intermediate resin layer and results in further weight reduction.

Preferably, at least one of the surface resin layers includes at least one depression and preferably may include a plurality of depressions. A roller or similar pressing member that presses the surface resin layer onto the intermediate resin layer may be used when the surface resin layer and the intermediate resin layer are adhered to each other. The surface of the pressing member may include a protrusion and this protrusion may be used to form the depression(s) on the surface resin layer. The volume of the intermediate layer is thereby decreased in correspondence to the depression(s), which reduces the material costs associated with the resin laminate product and results in further weight reduction. Furthermore, the pressing member acts to press the surface resin layer and form the depression(s). Thus, the synthetic resin laminate product may be continuously manufactured with high production efficiency.

Kenaf is preferably used in the ground product of plant origin. Kenaf is an African or East Indian plant having a botanical name of *Hibiscus cannabinus* and is also known as ambary. Kenaf yields a useful fiber that is used in canvas and cordage and the fiber has a specific gravity of between about 0.1 and 0.2, as compared to water at 4° C. (i.e. 1 gram per cubic centimeter). The use of kenaf has the benefit of preserving forest resources and thereby providing an environmentally friendly manufacturing process. Furthermore, waste resin materials may be utilized in the synthetic resin in order to recycle waste resin materials, which may increase the environmentally friendly manner of the manufacturing process.

If the resin formed product will be manufactured by pressure joining the melted resin on both sides by way of a contact surface, the temperature of the contact surface may be regulated or adjusted so that both surfaces of the melted resin are kept at the same or similar temperature. By keeping the temperature of both surfaces of the melted resin similar during pressure joining, the surfaces are prevented from contracting at different rates, thereby minimizing or preventing warping and distortion. If a pair of contact surfaces having similar heat conductance is used, the contact surfaces are maintained at an identical temperature and simultaneously contact the melted resin. Thus, the temperatures of both surfaces of the melted resin are kept similar during the pressure joining step.

DETAILED DESCRIPTION OF THE INVENTION

Hereafter, first and second preferred embodiments of the invention will be described in reference to the drawings.

First Representative Embodiment

Figure 3:
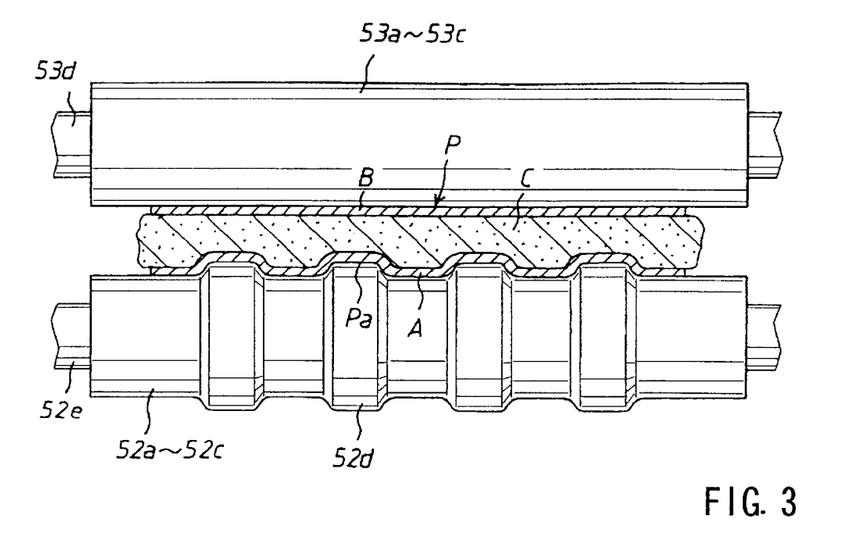
FIG. 3 is an expanded view of the roller press 50 shown in FIGS. 1 and 2.

Referring to FIG. 3, a synthetic resin laminate plate P can be made by adhering thin, plate-like coating materials A and B in a unitary manner onto both surfaces of an intermediate resin layer C. Four concave depressions or grooves Pa are formed parallel to each other and extend lengthwise along one surface (e.g. the lower surface) of the synthetic resin laminate plate P. The concave grooves Pa are formed by bending the coating material A into a ribbed shape. The coating materials A and B are thin plates or sheets of a synthetic resin formed in advance using extrusion techniques or other similar methods. The thickness of coating materials A and B are preferably about 2 mm. The thickness of the synthetic resin laminate plate P is preferably about 15 mm. The depth, width, and spacing of the concave grooves Pa are preferably about 5 mm, 40 mm, and 40 mm, respectively. The synthetic resin laminate plate P may be preferably used as a support material for automobile interiors.

The intermediate resin layer C preferably includes a granular ground product of plant origin suspended in a melted synthetic resin. The interior portion of intermediate resin layer C preferably includes air bubbles in order to impart a porous quality to the plate P. For example, the shape of the air bubbles or holes is preferably non-uniform. If the intermediate resin layer C includes a ground product of plant origin having a specific gravity (density) less than the specific gravity (density) of the synthetic resin and is porous, the plate P will have a lower specific gravity (density) than if only the synthetic resin is utilized. Therefore, weight reduction is possible.

In order to produce the intermediate resin layer C, a granular synthetic resin is first melted using frictional heat and the granular ground plant product is mixed into the melted synthetic resin. The melted synthetic resin is then extruded in a plate-shaped form at a pressure that is low enough to maintain a porous quality. For example, the synthetic resin used in the coating materials A and B and the intermediate resin layer C may be polypropylene, polyvinyl chloride, acrylnitrile butadiene styrene, a thermoplastic olefin resin such as thermoplastic olefin, an acrylic resin, or a combination of more than one of these compounds. The synthetic resin preferably includes a filler or strengthening agent in order to facilitate weight reduction and/or strengthening of the plate P. Although virgin synthetic resin materials may be utilized, preferably recycled synthetic resins, such as automobile bumpers or battery cases, may be utilized. The ground plant product may preferably be a ground product of the kenaf core (i.e. the core of the stalk of kenaf) or wood chips having a size of about 3–6 square millimeters. In addition, kenaf bark may be utilized and the preferred length of the kenaf bark is about 1–5 millimeters.

Further, kenaf is preferably utilized in a preferred range of about 0–35% of the weight of the resin material. For example, polypropylene may be utilized as the resin material and polypropylene has a specific gravity of 1.05–1.1 (i.e. a density of 1.05–1.1 grams per cubic centimeter). If kenaf is used in a ratio of 10–20% of the weight of the polypropylene, the resin products according to the present teachings will have a specific gravity of about 1–1.05.Further, if kenaf is used in a ratio of about 30% of the weight of the polypropylene, the resin product will have a specific gravity of about 0.85–0.89. Preferably, kenaf is not used above 40% of the weight of the polypropylene.

Figure 1:
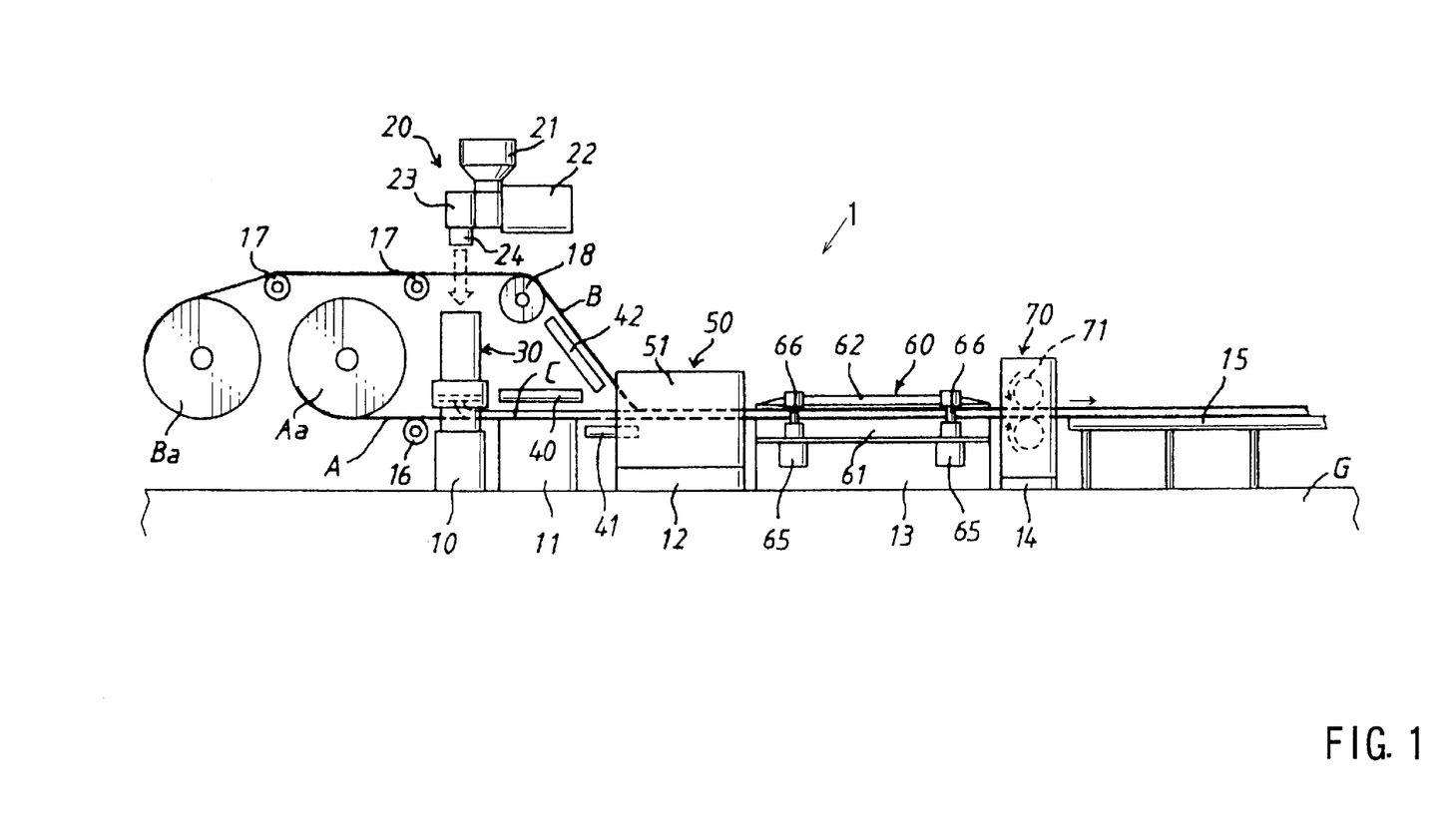
FIG. 1 shows a manufacturing device 1 for a first representative synthetic resin laminate product.

A representative manufacturing device 1 that is capable of manufacturing the synthetic resin laminate plate P is shown in FIG. 1. Device 1 may include a low-pressure extruder 30, heaters 40, 41, and 42, a roller press 50, a cooling press 60, an acceptor 70, and a work roller platform 15 that are supported, in order from the left, on a floor surface G by first through fifth support platforms 10–14. A stirring mixer 20 is positioned on the upper rear side of the low-pressure extruder 30. The first thin, plate-like coating material A is wound around a coating drum Aa in a tube-like configuration. The coating drum Aa is located on the upstream side of the low-pressure extruder 30. The first coating material A is pulled from the coating drum Aa, passes over a lower support roller 16, extends horizontally to the right, passes by the low-pressure extruder 30, the heaters 40 and 41, the roller press 50, the cooling press 60, and the acceptor 70, and is supplied to the work roller platform 15. A coating drum Ba is disposed on the left side of the coating drum Aa and the second thin, plate-like coating material B is wound in a tube-like configuration around coating drum Ba in a similar manner to the first coating material A. The second coating material B is pulled from the coating drum Ba, passes an upper support roller 17, a guiding roller 18, a heater 42, the roller press 50, the cooling press 60, and the acceptor 70, and is supplied to the work roller platform 15.

The intermediate resin layer C is extruded and supplied from the low-pressure extruder 30, is placed on the first coating material A and moves right together with the first coating material A. Then, the second coating material B is put into contact with the upper side of the intermediate resin layer C in the roller press 50, and the intermediate resin layer C is supplied to the cooling press 60 and the acceptor 70 sandwiched by the first coating material A and the second coating material B. A pair of accepting rollers 71 sandwich both sides of the intermediate resin layer C and the coating materials A and B while the product is moving to the right.

A representative method for manufacturing the synthetic resin laminate plate P will be described next. In a first step, a granular synthetic resin is melted, and a granular ground plant product, which serves as a filler, is mixed into the melted substance to yield a porous melted synthetic resin. In the first step, a stirring mixer 20 may be utilized that is, for example, the same or similar to the stirring mixer described in Japanese Laid-open Publication No. 10-151332. The stirring mixer 20 serves as a first processing part and may include a conveyer screw on an axle rotatably driven by a motor 2 and a plurality of radially protruding blades (not shown).

A granular (including chipped) resin substance may be made, for example, by grinding waste synthetic resin into irregular shapes of a size about 8 square millimeters or less may be used as the synthetic resin. After placing the synthetic resin into a hopper 21 of the stirring mixer 20, the synthetic resin is sent to a mixing chamber 23 on a conveyer screw, is stirred by a plurality of blades, and is melted due to frictional heat. The commencement of melting of the synthetic resin may be detected based upon changes in the temperature of a portion of the mixing chamber 23 or changes in the load current of the motor 22. Immediately after melting begins, the ground plant product is placed into the hopper 21 and mixed into the melted synthetic resin in the mixing chamber 23. For example, a granular (including chipped) ground kenaf core product having irregular shapes of about 6 square millimeters or less may be used as the ground plant product. The ground kenaf core product is added, for example, at a preferred ratio of about 25–35% kenaf core to about 65–75% synthetic resin by weight and more preferably about 30% kenaf to 70% synthetic resin, such as polypropylene.

After the ground kenaf core product has been uniformly mixed into the melted synthetic resin (e.g., about five seconds after the ground kenaf core product is input), the door on the lower part of the mixing compartment 23 is opened. The synthetic resin containing the ground kenaf core product is discharged from an output port 24 and is then sent to a supply tube 34 of the low-pressure extruder 30 by a conveyer (not shown). The melted synthetic resin is stirred by the blades in a state mixed with the ground kenaf core product and thus a coarse, porous quality (i.e., the shape of the holes is non-uniform) is imparted to the melted synthetic resin material. In addition, air is preferably mixed into the melted synthetic resin material.

Figure 2:
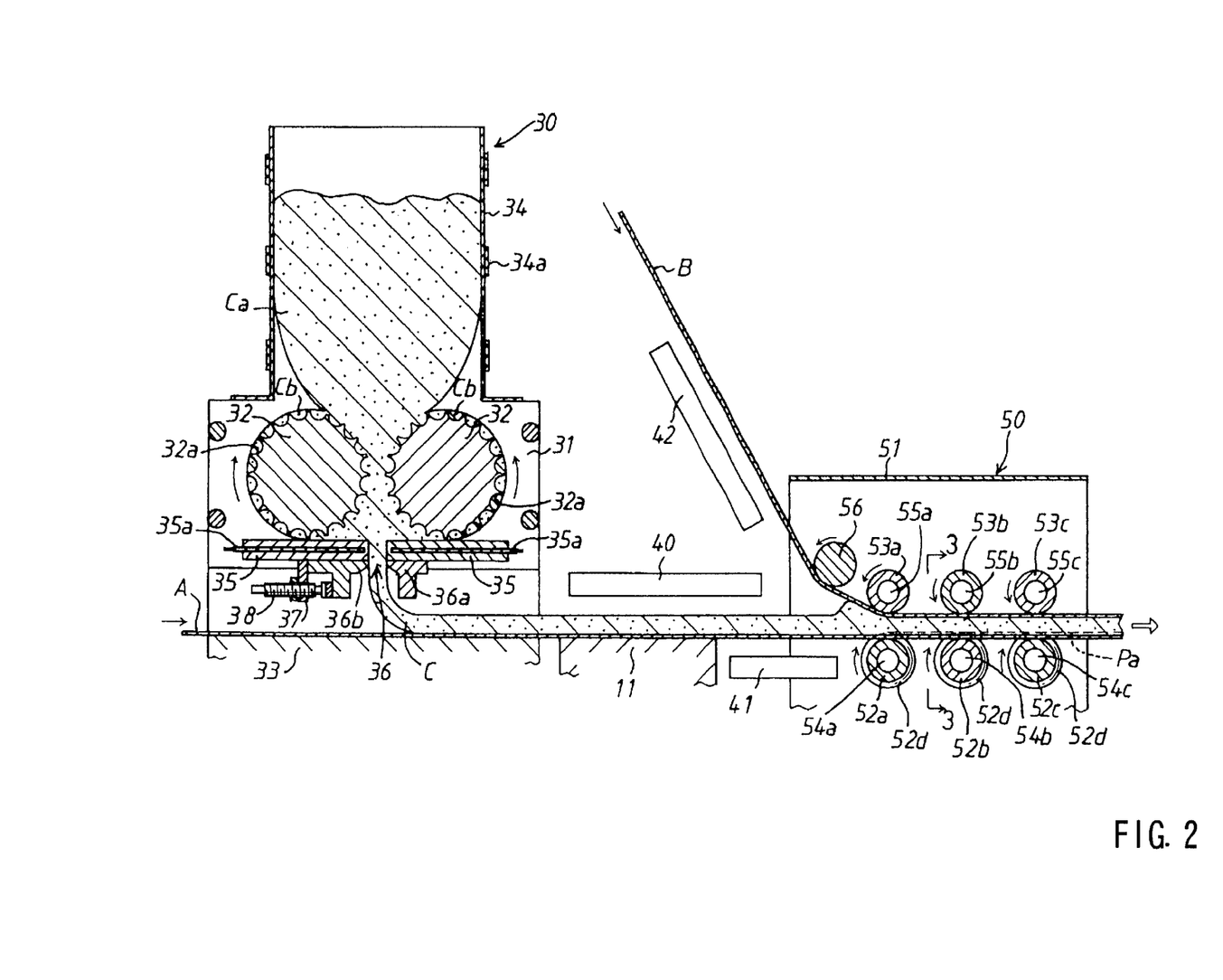
FIG. 2 is an expanded view of a portion of FIG. 1.

In the second step, the melted synthetic resin generated in the first step is extruded toward the upper surface of the first coating material A, which is a surface resin layer. As shown in FIG. 2, the low-pressure extruder 30 serves as a second processing part and may include a pair of extraction rollers 32 and 32 within a body 31. The extraction rollers 32 and 32 are rotatably driven in opposite directions relative to one another by a motor (not shown). The mutually opposing portions of the extraction rollers 32 rotate downwardly as shown in FIG. 2. The extraction rollers 32 further include a plurality of concave grooves 32a having a semicircular cross-section and these concave grooves 32a extend axially on the outer circumference of the extraction rollers 32.

A pair of intermediate support plates 35 are disposed below the extraction rollers 32 within the body 31. An output port 36 is defined between the pair of intermediate support plates 35 and 35. A first exit formation member 36a is affixed to one of the intermediate support plates 35. The other intermediate support plate 35 includes a second exit formation member 36b that can move toward the output port 36. The second exit formation member 36b is moved by an adjustment screw 38 that is threaded onto a support fixture 37 affixed to one of the intermediate support plates 35. By rotating the adjustment screw 38, the width of the output port 36 is adjusted to be slightly larger than the optimum post-formation thickness (e.g., 11 mm) of the intermediate resin layer C of the synthetic resin laminate plate P.

A supply tube 34 is disposed above the body 31 and receives the melted synthetic resin Ca from the low-pressure extruder 30. Heaters 34a and 35a are disposed on the supply tube 34 and the intermediate support plate 35, and another heater (not shown) may be disposed on the extraction rollers 32. The supply tube 34 is heated to 300° C., the extraction rollers 32 are heated to 180–200° C. and the intermediate support plates 35 are heated to 250° C. by the heaters.

The melted synthetic resin Ca is pulled into the space between the extraction rollers 32 and 32 and adheres to the outer circumference of the extraction rollers 32. The melted synthetic resin Ca then passes through the space and is sent toward the lower intermediate support plates 35, thereby becoming an intermediate resin layer C having a uniform thickness. The intermediate resin layer C is then extruded through the output port 36. A portion Cb of the melted synthetic resin Ca adheres within the concave grooves 32a of the extraction rollers 32 and is cycled back. Because the melted synthetic resin Ca is extruded from the output port 36 due to viscous friction between the extraction rollers 32, the output pressure does not rise, the porosity of the melted synthetic resin Ca is therefore not lost, and the ground kenaf core product mixed into the synthetic resin is not further pulverized.

In the third step, the intermediate resin layer C extruded from the output port 36 of the low-pressure extruder 30 is moved together with the first covering material A on top of the first covering material A in the third processing part, as shown in FIG. 2. As shown in FIGS. 1 and 2, an intermediate resin layer heater 40, a second coating heater 42, and a first coating heater 41 are provided as means for heating on the downstream side of a support floor 33 of the low-pressure extruder 30. The upper surface of the intermediate resin layer C is placed on the first coating material A and is heated by the intermediate resin layer heater 40 in the space between the second support platform 11 to the roller press 50. As a result, the surface temperature of the intermediate resin layer C and the first coating material A rises to 100–120° C. The surface temperature of the lower surface of the first coating material A is rapidly heated to a range of 120–140° C. by the first coating heater 41. As a result, the first coating material A softens. The lower surface of the second coating material B is heated to a range of 80–90° C. by the second coating heater 42.

In the fourth step, the second coating material B (i.e. the surface resin layer) is placed on the intermediate resin layer C that moved with the first coating material A in the third step. Pressure is applied and both coating materials A and B are adhered to the surfaces of the intermediate resin layer C. In addition, the first coating material A is bent to impart a ribbed shape and form four concave grooves Pa parallel to each other on the lower surface of the synthetic resin laminate plate P. As shown in FIGS. 1 and 2, the roller press 50 serves as the fourth processing part and includes a machine frame 51, three bottom-side rollers 52a–52c, and three top-side rollers 53a–53c, the latter two being oriented in opposition to each other, as well as a guide roller 56. The bottom-side rollers 52a–52c are lined up and arranged horizontally so as to support the first coating material A. Four toric protrusions 52d are formed on the outer circumferences of the bottom-side rollers 52a–52c and are utilized to form a depression groove Pa on the bottom surface of the first coating material A. A large area is formed on both shoulders and both corners of the toric protrusion 52d, which may be omitted if not needed.

The top-side rollers 53a–53c are arranged in a position corresponding to the thickness of the synthetic resin laminate plate P and are elastically impelled by a strong spring toward the bottom-side rollers 52a–52c. The rollers 52a–52c and 53a–53c are driven to rotate in the direction of the arrow in the figure so that the synthetic resin laminate plate P moves to the right. Heat medium holes 54a–54c and 55a–55c are provided in the rollers 52a–52c and 53a–53c. Heated water is passed through the heat medium holes 54a and 55a, which constitute a means for heating, to heat the first rollers 52a and 53a to 80–90° C. Cool water is passed through the heat medium holes 54c and 55c, which constitute a means for cooling, to cool the third rollers 52c and 53c to 15–25° C. Water of an intermediate temperature is passed through the heat medium holes 54b and 55b, which constitute a means for temperature adjustment, to adjust the temperature of the second rollers 52b and 53b to 60–70° C.

When the upper and lower coating materials A and B pass through the space between the first rollers 52a and 53a, which are heated by the heating means 54a, the upper and lower coating materials A and B are pressed against and adhere to both sides of the melted intermediate resin layer C. The first coating material A is simultaneously bent to impart a ribbed shape by the toric protrusion 52d of the heated first bottom-side roller 52a. Thus, four mutually parallel concave grooves Pa (depressions) are formed in the lower surface of the synthetic resin laminate plate P. A portion of the melted intermediate resin layer C positioned on the upper die of the concave grooves Pa is pushed away on both sides. The intermediate resin layer C on both sides adheres to the coating materials A and B, whose thickness has expanded. The concave grooves Pa are formed on the synthetic resin laminate plate P and the synthetic resin laminate plate passes between the second rollers 52b and 53b whose temperature has been regulated. The synthetic resin laminate plate is adjusted to an intermediate temperature and is cooled as it passes between the third rollers 52c and 53c, which are cooled by the cooling means 54c and 55c. The second and third bottom-side rollers 52b and 52c comprise the toric depression 52d. Therefore, even the concave grooves Pa of the synthetic resin laminate plate P are cooled.

In the fifth step, the synthetic resin laminate plate P, which was partially cooled and hardened in the fourth step, is further cooled and hardened. The cooling press 60 serves as the fifth processing part used in the fifth step and includes a bottom-side press member 61 and a top-side press member 62, as shown in FIGS. 1 and 3. The bottom-side press member 61 is supported by the fourth support platform 13 and includes a planar upper surface having a width that is slightly greater than the synthetic resin laminate plate P being manufactured. The upper surface is positioned at a height identical to the lower surface of the first coating material A, which is supported by the bottom-side rollers 52a–52c of the roller press 50. A slightly inclined surface 61a is formed at the front and back ends of the bottom-side press member 61. The top-side press member 62 opposes the upper surface of the bottom-side press member 61 and includes a planar lower surface having an inclined surface 62a formed on the front and back ends. The top-side press member 62 is guided and supported by a guide rod 66 to permit vertical movement with respect to the bottom-side press member 61. The top-side press member 62 reciprocates up and down under an eccentric cam mechanism 65 at a frequency of about 1 Hz.

Cooling pipes 63 and 64, which conduct water or another coolant, are disposed within the respective press members 61 and 62 in order to forcible cool the press members 61 and 62. The top-side press member 62 makes contact under its own weight at its lower surface with the upper surface of the second coating material B when the top-side press member is lowered in order to press the second coating material B (see solid line if FIG. 4). When the top-side press member 62 is raised, the lower surface of the top-side press member 62 separates from the upper surface of the second coating material B (see double dash line in FIG. 4). In other words, the space between the press members 61 and 62 varies over a range greater than the thickness of the synthetic resin laminate plate P during a short period (e.g., about 1 Hz).

Figure 4:
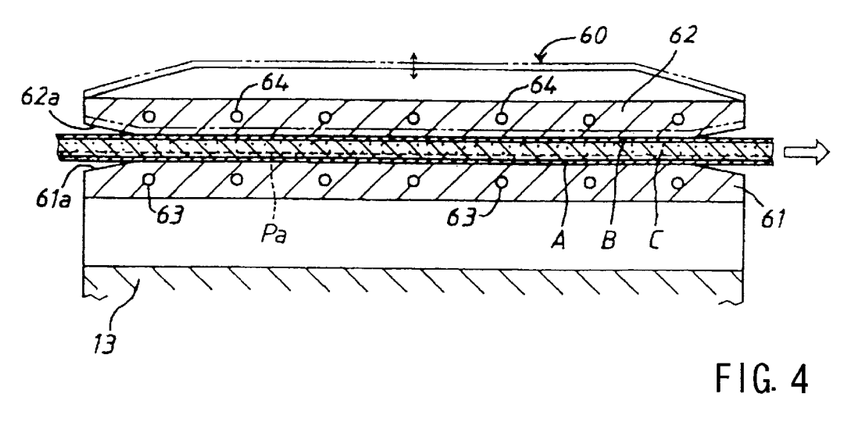
FIG. 4 is an expanded view of the cooling press 60 shown in FIG. 1.

The lower surface of the first coating material A is always in contact with the upper surface of the bottom-side press member 61. Therefore, the bottom-side press member 61 always cools the lower surface of the synthetic resin laminate plate P. With the top-side press member 62 in the lowered position, the top-side press member 62 and the bottom-side press member 61 press the upper and lower surfaces of the synthetic resin layer plate P under the weight of the top-side press member 62. Therefore, the intermediate resin layer C, which is partially cooled at this time with the coating materials A and B having been just adhered to both surfaces thereof in the fourth step, is cooled due to heat transfer to the bottom-side press member 61 and the top-side press member 62.

With the top-side press member 62 in the raised position, the synthetic resin laminate plate P is free to move in the lengthwise direction. The synthetic resin laminate plate P is cooled into a solid by the frequent repetition of pressure and cooling by the top- and bottom-side press members 61 and 62. In addition, the synthetic resin laminate plate P is cooled by the movement when pressure is released while the synthetic resin passes through the cooling press 60. In this embodiment, the upper surface of the bottom-side press member 61 of the cooling press 60 is planar. However, four protrusions can be formed on the upper surface of the bottom-side press member 61 in order make contact with the concave grooves Pa without leaving any gaps, which modification would further improve cooling efficiency.

The acceptor 70 on the downstream side of the cooling press 60 sandwiches the synthetic resin laminate plate P between a pair of accepting rollers 71 that rotate in the direction of the arrows in the drawing. The plate P is extracted and sent to the work roller platform 15. Thus, the synthetic resin laminate plate P is formed continuously in the manner discussed above and is the cut into predetermined lengths on the work roller platform 15.

In the synthetic resin laminate plate P of this embodiment, the intermediate resin layer C is porous, and the granular ground plant product mixed therein is not finely pulverized. Therefore, the specific gravity (density) of the material is relatively low. Further, the resulting product is lightweight. By mixing the ground plant product into the synthetic resin, the thermal contraction rate reduced and thus fewer deformities will result. Volatile substances contained in the kenaf core, such as moisture and wood acid, vaporize and are released to the outside due to the heat generated during mixing in the stirring mixer 20. Further, the pores formed in the porous intermediate resin layer C are not continuous. Therefore, moisture absorption or other factors do not affect the quality of the product.

In the above embodiment, the synthetic resin laminate plate P comprises thin, platelike coating materials A and B that are adhered to both surfaces of the porous intermediate resin layer C. Further the synthetic resin laminate plate P is continuously manufactured with high production efficiency. Moreover, the melted synthetic resin Ca that becomes the intermediate resin layer C does not lose its porosity when it is extruded in the second step. Therefore, the synthetic resin laminate plate P retains its light weight.

In the above embodiment, a plurality of concave grooves 32a extends axially with respect to the outer circumference of the extraction rollers 32. Therefore, the melted synthetic resin Ca can adhere to the outer circumference of the extraction rollers 32 and the extrusion of the intermediate resin layer C from the output port 36 is ensured, resulting the reliable manufacture of the synthetic resin laminate plate P.

In the embodiment, any distortion caused during cooling of the laminate, in which the coating materials A and B are adhered to both sides of the melted synthetic resin Ca, is automatically corrected by the press members 61 and 62.

In the above embodiment, the granular, ground kenaf core product is mixed after the granular synthetic resin stirred by the blades begins to melt. Therefore, the granular, ground kenaf core product is not finely pulverized due to the pre-melted synthetic resin, and there is little possibility of carbonization. The granular size of the ground kenaf core product mixed into the intermediate resin layer C is therefore maintained at a relatively large size. Consequently, the weight reduction and thermal contraction rate reduction effects for the synthetic resin laminate plate P are increased. The ground kenaf core product may be added, for example, immediately before the synthetic resin melts. On the other hand, if a granular ground plant product that is not readily pulverized is used, such as wood chips, the synthetic resin and the ground plant product may be simultaneously input into the hopper 21 of the stirring mixer 20.

When the coating materials A and B are joined to the intermediate resin layer C, the second coating material B is joined later than the first coating material A. Therefore the adherence of the second coating material B could possibly be inadequate relative to the adherence of the first coating material A due to a temperature drop from heat release. In this embodiment, however, the surface on which the intermediate resin layer C and the second coating material B are joined is heated with heaters 40 and 42 immediately before the second coating material B is joined onto the intermediate resin layer C. Thus, the drop in temperature due to heat release is rectified, and the second coating material B is reliably adhered to the intermediate resin layer C. If the adherence of the first coating material A to the intermediate resin layer C is inadequate, a heater should be installed in order to heat the upper surface of the first coating material A in front of the low-pressure extruder 30.

In the embodiment, four concave grooves Pa are formed on the synthetic resin laminate plate P. Therefore, the volume of the intermediate synthetic resin is reduced by an amount corresponding to the volume of the concave grooves Pa. Further, the material costs of the synthetic resin laminate plate P are reduced by as much, and the weight of the product is reduced. Moreover, the depth and width of the concave grooves Pa may be increased in order to increase the weight reduction effect. For example, the properties of the coating material A could be adjusted to permit easier shaping, the thickness could be reduced, or the extent of the heating of the coating material A by the first coating heater 41 could be increased.

In the embodiment, a granular ground plant product is additionally mixed into the porous intermediate resin layer C. Therefore, the specific gravity (density) of the intermediate resin layer C decreases in proportion to the amount of ground plant product that has been added, because the ground plant product has a specific gravity that is lower than the synthetic resin. Thus, the weight of the synthetic resin laminate plate P can be reduced. However, the ground plant product is not required to be mixed into the intermediate resin layer C. Instead, the weight reduction may result from the concave grooves Pa.

In the embodiment, the first coating material A is bent to impart a ribbed shape when it is adhered by the bottom-side rollers 52a–52c. Therefore, the synthetic resin laminate plate P, which has four parallel concave grooves Pa formed on one side, has a manufacturing cost that is nearly identical to the manufacturing costs of conventional products. Further, the synthetic resin laminate plate P is continuously manufactured with high production efficiency. In addition, the first coating heater 41 is equipped upstream of the bottom-side rollers 52a–52c to heat and soften the coating material A in advance. Therefore, the formation of the ribbed shape and concave grooves Pa of the coating material A by the bottom-side rollers 52a–52c with the toric protrusion 52d is continuously performed.

Although the above embodiment provides only one pair of the third rollers 52c and 53c to cool the synthetic resin laminate plate P, the number of such rollers can be increased in order to permit the synthetic resin laminate plate P to be cooled more quickly. In that case, the cooling press 60 may be omitted.

In the above embodiment, the granular synthetic resin, which contains ground synthetic resin waste, is put into the stirring mixer 20 and then pulverized and melted under the frictional heat from a plurality of rotating blades. Therefore, the melted synthetic resin is easily produced at a low cost.

Although the concave grooves Pa are formed on the side of the first coating material A, the concave grooves Pa also may be alternatively formed on the second coating material B side. In such a case, a toric protrusion should be provided on the top-side rollers 53a–53c instead of on the bottom-side rollers 52a–52c. Further, the second coating material B should be heated to a higher temperature by the first coating heater 41. In that case, the first coating material A is heated to a lower temperature by the first coating heater 41.

In the above embodiment, the concave grooves Pa are provided on only one side of the synthetic resin laminate plate P, which configuration is especially suited for use in trucks, luggage carriers, floors, and other situations in which one surface is hidden. The concave grooves Pa may be provided on both sides of the synthetic resin laminate plate P and put to a use that requires neither side to be planar. In this case, the concave grooves Pa on both sides may be arranged to directly oppose each other or may be staggered.

The coating on which the concave grooves have been formed contracts to a large extent in the direction perpendicular to the concave grooves during cooling. Therefore, if concave grooves are provided on only one die of the synthetic resin laminate plate, the side on which the concave grooves are provided problematically warps in a convex manner as seen in a cross section perpendicular to the concave grooves. This problem is solved by making the coating on the opposite side contract more during cooling.

Although each of the press members 61 and 62 of the cooling press 60 has a planar shape in this embodiment, the press members may be have a shape that is slightly curved in either the lengthwise or crosswise direction to allow the manufacture of curved synthetic resin laminate plates.

A foaming agent may be mixed into the melted synthetic resin Ca produced in the first step. The foaming agent used is preferably an azodicarbonamide-based substance or a sodium hydrogen carbonate-based substance that thermally decomposes at 180–200° C. For example, polypropylene with a specific gravity (density) of 0.9 could be used as the synthetic resin. In addition, an azodicarbonamide-based substance (e.g. product no. EV309 of Eiwa Chemical, foams at 180–200° C.) can be used as the foaming agent. In this case, 10 parts by weight of the foaming agent can be mixed into 100 parts by weight of the granular synthetic resin and ground kenaf core product.

The melted synthetic resin Ca into which the ground kenaf core product and foaming agent have been mixed develops irregular, coarse pores due to the stirring action of the blades. The melted synthetic resin Ca also develops fine pores due to the gas generated when the foaming agent thermally decomposes. By using a foaming agent, the melted synthetic resin C itself obtains fine pores, and its specific gravity decreases. This could result, for example, in an intermediate resin layer C with a specific gravity of 0.57 (i.e. a density of 0.57 grams per cubic centimeters).

To the contrary, if a foaming agent is not added to a substance made by grinding waste polypropylene with a specific gravity of 0.98 into a granular form, an intermediate resin layer having a specific gravity of 0.85 will result (i.e. a density of 0.85 grams per cubic centimeters). If polypropylene having a specific gravity of 0.9 and a sodium hydrogen carbonate-based substance (e.g. product no. EE207 of Eiwa Chemical) as the foaming agent are used, and four parts by weight of the foaming agent are mixed into 100 parts by weight of the granular synthetic resin and ground kenaf core product, an intermediate resin layer C having a specific gravity of 0.68 is produced (i.e. a density of 0.68 grams per cubic centimeters). If polypropylene having a specific gravity of 1.1 and a different sodium hydrogen carbonate-based substance (e.g. product no. EV405D of Eiwa Chemical) as the foaming agent are used, and one part by weight of the foaming agent is mixed into 100 parts by weight of the granular synthetic resin and ground kenaf core product, an intermediate resin layer C having a specific gravity of 0.73 is produced (i.e. a density of 0.73 grams per cubic centimeters).

Second Representative Embodiment

Figure 5:
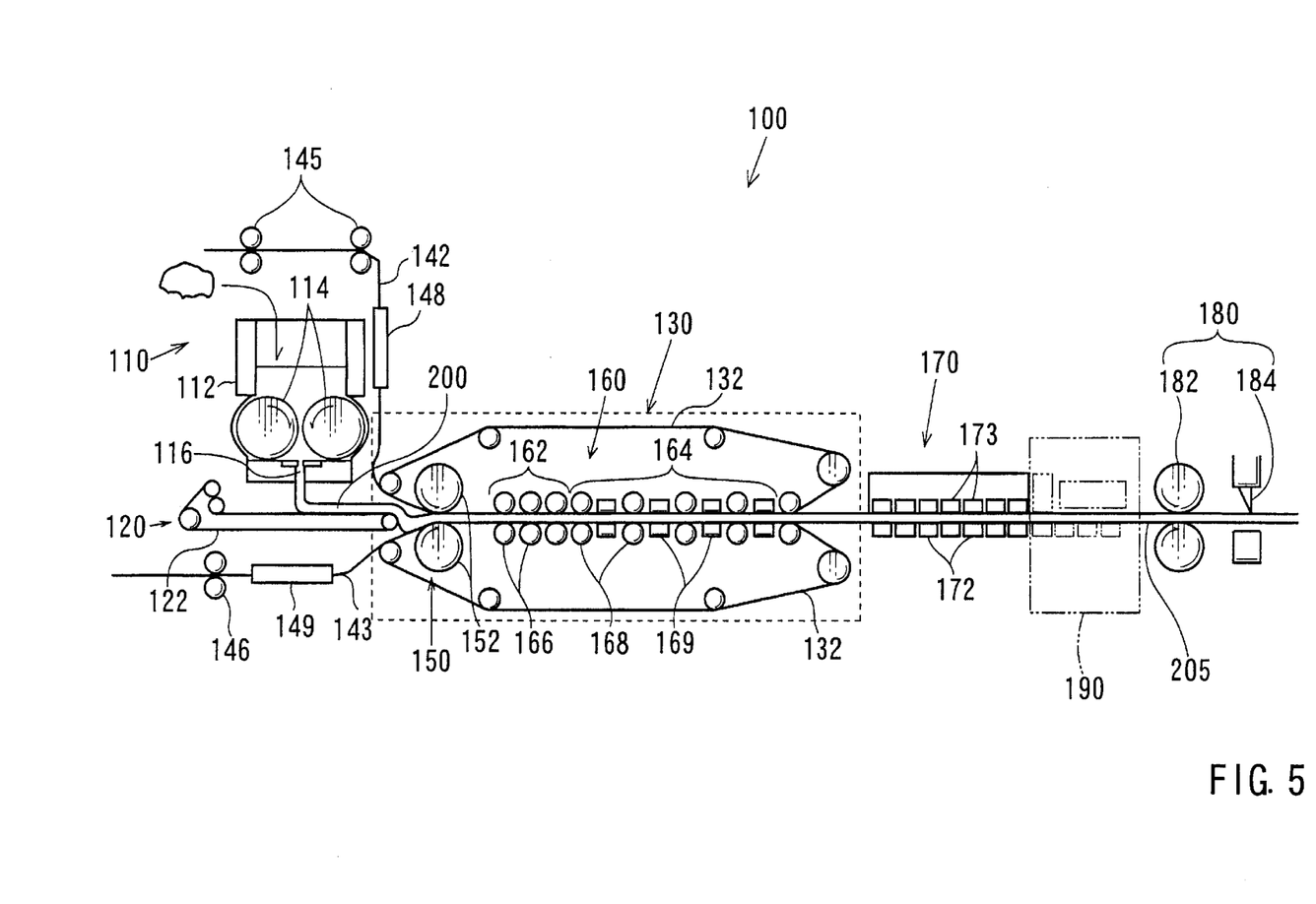
FIG. 5 shows a manufacturing device 100 for a second representative synthetic resin laminate product.

In the second representative embodiment, a material 200 is formed into a resin formed product using the manufacturing device 100 shown in FIG. 5. The manufacturing device 100 comprises a material supplier 110, a first transporter 120, a second transporter 130, and a means for pressure joining 150. Any of a variety of suppliers capable of continuously supplying the material 200 in a softened state can be used as the material supplier 110. In this context, the material 200 preferably has at least a melted surface and more preferably, the material 200 is melted as a whole. The term "continuous" may in this case mean either intermittent or continual.

The material 200 is a material that includes a thermoplastic synthetic resin similar to the first embodiment. The material 200 is not limited to a material having only a resin material or a material consisting essentially of a resin material. It may be, for example, a material consisting essentially of a solid lignocellulose, such as wood chips, sawdust, or kenaf core that includes a resin material as a joining agent or adhesive. The melted synthetic resin Ca of the first embodiment may be used as well.

The material supplier 110 may include a material mixing and melting machine (not shown) and an extruder 112 that extrudes the melted material 200. The material mixing and melting machine is a device that uniformly mixes the resin material and other substances to be mixed, regulates the material 200, and melts the resin material components. The material mixing and melting machine comprises, for example, a hopper for inputting materials, a screw conveyer for mixing and transporting, and a plate-like blade for frictionally heating the synthetic resin.

The extruder 112 is capable of continuously extruding the melted or softened material 200 at a set or predetermined rate. A pair of rollers 114 are disposed in front of an extrusion port 116 and rotate so that the circumferential surfaces proximate to the extrusion port 116 both move in the direction of the extrusion port 116, thereby extruding the material 200 from the extrusion port 116. In the extruder 112, a plurality of concave grooves (not shown) that extend parallel to the rotational axles of the rollers 114 are provided on the surfaces of the rollers 114. Thus, the extrusion rate remains constant.

The first transporter 120 retains the material 200 and continuously transports it. The first transporter 120 preferably can continuously transport at a set or predetermined rate and is capable of regulating the rate. Preferably, any of a variety of conveyers can be used as the first transporter 120. In this embodiment, the first transporter 120 is a belt conveyer 122 that is positioned approximately horizontally beneath the extrusion port 116 of the material supplier 110.

The surface of the first transporter 120 that makes contact with the material 200, i.e., the surface of the conveyer belt 122, can be released from the material 200. For example, the conveyer belt 122 may include a synthetic resin or rubber material having a surface to which a fluorine resin layer has been applied using Teflon processing or another substance having a treated belt surface. The belt surface may be coated with a release material.

The first transporter 120 may include a means for temperature regulation that regulates the temperature of the material 200. The temperature regulation means regulates the temperature of the first transporter 120 so that, for example, the portion of the material to be formed on the side that contacts the first transporter 120 is the same temperature as the portion of the material on the rear side thereof.

Figure 6:
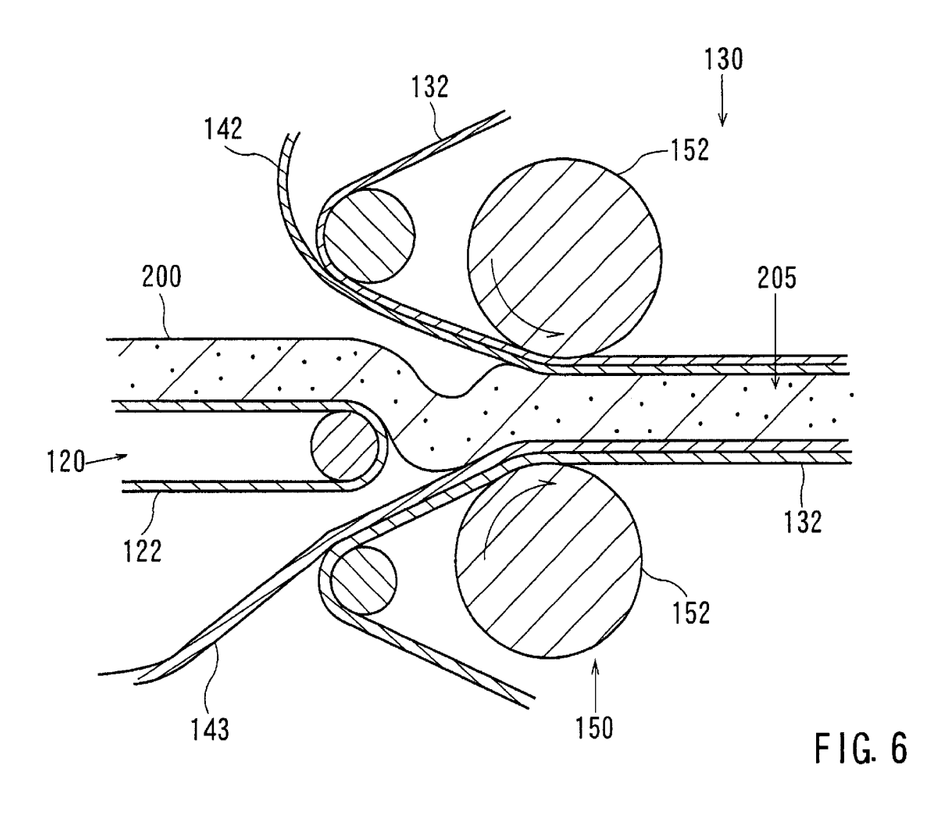
FIG. 6 is an expanded view of a portion of FIG. 5.

The second transporter 130 is a means for continuously transporting at a set or predetermined interval a first coating material 142 and a second coating material 143 that are the contact surfaces of the material 200 and is situated throughout the downstream section of the first transporter 120. The second transporter 130, as shown in FIG. 5, includes a parallel pair of belt conveyers 132 and 132 separated by a space. The second transporter 130, as shown in FIGS. 5 and 6, is positioned so that the front ends of the belt conveyers 132 and 132 sandwich the rear end of the first transporter 130. Therefore, the material 200 smoothly passes from the first transporter 120 to the second transporter 130.

The coating materials 142 and 143 have surfaces that contact the material 200. The surfaces that contact the material 200 may be include with a variety of curved faces or a rough face may be formed thereon, but they are preferably smooth planar surfaces. The coating materials 142 and 143 are fixated to the surfaces of the material 200 in a laminated manner to form a laminate product with the material 200. The coating materials 142 and 143 are sheet-like, each having a planar contact surface that is affixed to the surfaces of the material 200.

The coating materials 142 and 143 may be a woven material, knitted material, nonwoven cloth, laminated board, or other soft, flexible film or sheet material formed using any of a variety of formation methods. The coating materials 142 and 143 may be a laminated item. The coating materials 142 and 143 are preferably a material that includes a thermoplastic synthetic resin similar to the coating materials A and B of the first embodiment. A color as well as a two- or three-dimensional pattern, drawing or other design may be applied to the surface of the coating materials 142 and 143 on the side that does not touch the material 200.

In the manufacturing device 100, a supplier (not shown) may supply the covering materials 142 and 143 to the second transporter 130 and may be disposed further upstream than the material supplier 110. A plurality of support rollers 145 and 146, as shown in FIG. 1, are provided downstream from the supplier. The support rollers 145 and 146 lead the coating materials 142 and 143 to the front portion of the second transporter 130.

In the manufacturing device 100, temperature adjustors 148 and 149 are provided on the transport route that extends until the point the coating materials 142 and 143 are supplied to the second transporter 130. The temperature adjustors 148 and 149 are means for performing adjustments so that the covering materials 142 and 143 are at the same temperature when placed in contact with the surfaces of the material 200. The temperature adjustors 148 and 149 are typically one of a variety of heaters that heat the covering materials 142 and 143 to the desired temperature. The temperature adjustors 148 and 149 are preferably positioned so as to be about equidistant from a means for pressure joining 150 on the transport route of the covering materials 142 and 143.

The second transporter 130 includes a means for simultaneously causing the covering materials 142 and 143, which is arranged at a set interval, to the surfaces of the opposing material. In the manufacturing device 100 shown in FIGS. 5 and 6, a pair of elongated rollers 152 is provided on the front part of the second transporter 130 in opposition to each other as means for upper and lower movement. The elongation rollers 152 clamp down on the surface materials 142 and 143. Thus, the space between of the surface materials 142 and 143 decreases when the material 200 is positioned between the covering materials 142 and 143.

The means for pressure joining 150 is a device that uniformly pressure joins the material 200 transported by the second transporter 130 from the outer sides of the covering materials 142 and 143. The pressure joining means 150 typically is heated to a set temperature and comprises the pair of elongated rollers 152 and 152 that clamp down on the material 200 at a designated pressure. The elongated rollers 152 (the pressure joining means 150) are also employed as a means for causing the covering materials 142 and 143 to contact the surfaces of the material 200.

A means for formation 160, a means for cooling 170, a means for cutting 180, and a variety of other means that process the formed product are provided downstream of the pressure joining means 150. The formation means 160 forms and cools a laminate 205 comprising the material 200 and the covering materials 142 and 143, thereby imparting a designated thickness. As shown in FIG. 5, an upstream portion 162 of the formation means 160 comprises a plurality of pressure rollers 166 through which cooling water is passed. A downstream portion 164 includes an alternating arrangement of a plurality of rollers 168 and cooling bars 169. The pressure rollers 166, the rollers 168, and the cooling bars 169 are each present in pairs arranged in opposition on the upper and lower sides of the second transporter 130.

The cooling means 170 is a device that cools the sides of the laminate 205. The cooling means 170 comprises cooling bars 172 and 173 that sandwich the laminate 205 and oppose each other. The cooling bars 172 are affixed on the lower side of the laminate 205. The cooling bars 173 are constantly in contact with the upper surface of the laminate 205.

The cutting means 180 comprises an accepting roller 182 that sends at a set rate the laminate 205 once formation is complete and a cutter 184 that cuts the laminate 205 into set lengths.

A representative method for manufacturing a resin formed product with the manufacturing device 100 will be described next. Ingredients of the material 200 are input into the material mixing and melting machine (not shown) located upstream of the material supplier 110 and mixed to uniformity to prepare the melted material 200. Then, the material 200 is input into the extruder 112 shown in FIG. 5 and continuously dropped onto the first transporter 120 at a set pressure and rate. The first transporter 120 transports the dropped material 200 at a set rate up to the rear end of the first transporter 120. The transport rate of the first transporter 120 is adjusted independently of the dropping rate of the material 200 by the material supplier 110, and the amount of the material 200 input into the second transporter 130 per unit time is regulated.

Next, the covering materials 142 and 143 are placed into contact with and pressure joined to the material 200. In the manufacturing device 100, the means for contacting and the means for pressure joining 150 the covering materials 142 and 143 to the material 200 are used together, so contacting and pressure joining are simultaneously performed. The covering materials 142 and 143 pass by the upper and lower sides of the first transporter 120 and are supplied, at a rate identical to the transport rate of the second transporter 120, to the front end of the second transporter 130 by a driving mechanism (omitted from the drawings) and the support rollers 145 and 146.

In this embodiment, the covering materials 142 and 143 are both heated to an identical temperature by the temperature adjustors 148 and 149, which serve as the means for temperature adjustment. The temperature adjustors 148 and 149 heat the covering materials 142 and 143 to a temperature identical to the elongation rollers 152, serving as the pressure joining means 150, or so the covering materials 142 and 143 are of an identical temperature when they make contact with the elongation rollers 152. If the elongation rollers 152 are at 70° C., the temperature adjustors 148 and 149 are preferably adjusted to 70–90° C. In other words, the temperature of the temperature adjustors 148 and 149 is preferably set to a temperature identical to or slightly above the temperature of the elongated rollers 152.

The covering materials 142 and 143, supplied to the second transporter 130, are respectively placed in firm contact with the conveyer belt 132 of the second transporter 130 and positioned with a set interval therebetween. The material 200 is sent toward the area between the covering materials 142 and 143 by the first transporter 120. As shown in FIGS. 5 and 6, the covering materials 142 and 143 are respectively put into contact with the upper and lower surfaces of the material 200, sent in a belt-like form, by the elongation rollers 152, which serve as the contacting means. The product to be formed 200 is substantially transported by the second transporter 130 after it is put into contact with the covering materials 142 and 143.

As is shown in FIG. 5, the material 200 is transported while dropping from the back portion of the first transporter 120. Therefore, the material 200 makes contact with the second covering material 143 positioned on the front end of the second transporter 130 before being sent to the elongated rollers 152. The location of contact between the second covering material 143 and the material 200 is near the elongation rollers 152. Thus, while the points in time that the material 200 makes contact with the covering materials 142 and 143 may differ slightly, there is little difference in the temperatures of the surfaces of the material 200 during pressure joining.

The elongated rollers 152 cause the covering materials 142 and 143 to contact the surfaces of the material 200 while pressing and pressure joining the material 200 from the outer sides of the covering materials 142 and 143. The elongated rollers 152, which serve as the pressure joining means 150, perform pressure joining so that the thickness of the material 200 and the covering materials 142 and 143 that cover the sides is a set or predetermined thickness. The elongation rollers 152 simultaneously affix the covering materials 142 and 143 to the material 200 to form the laminate 205. The covering materials 142 and 143 are adhered and satisfactorily attached to the material 200 due to the melted portion of the surfaces of the material 200.

Thereafter, the laminate 205 is formed by the formation means 160. The formation means 160 cools the material 200 to a temperature at which it will not melt while forming the laminate 205 (the material 200) at a set thickness. Formation occurs primarily at the upstream portion 62 of the formation means, and cooling proceeds mainly at the downstream portion 64 thereof.

Next, the laminate 205 is cooled by the cooling means 170 to a temperature at which the material 200 solidifies. In the cooling means 170, the plurality of cooling bars 173 on the upper side and the cooling bars 172 on the lower side make contact with the laminate 205 cool both sides of the laminate 205 and simultaneously transport it. The cooling bars 173, which comprise an escape mechanism, transport the laminate 205 without causing resistance between the bars and the laminate 205. The formation of the elongated sheet-like resin formed product extending in the direction of transport of the second transporter 130 is completed by the cooling means 170. The elongated sheet-like resin formed product is transported at a set rate to the cutter 184 while it is received by the accepting roller 82 of the cutting means 180. The cutter 184 cuts it into set lengths to produce a resin formed product of a set or desired shape.

In this manufacturing method, the covering materials 142 and 143 are contact the material 200 at the same time they are pressure joined. Therefore, the difference between the temperatures of the sides of the material 200 at the time of pressure joining is reduced, a difference in contraction rates due to the formation and cooling does not readily occur, and a highly precise formed product is obtained. For example, a formed board having a width of 910 mm and a length of 1,830 mm was manufactured and the formed board exhibited warping less than about ±0.2 mm from the horizontal.

With this manufacturing method, the temperature adjustors 148 and 149 are provided on the transportation route of the covering materials 142 and 143 before supply to the second transporter 130, and the temperature of the covering materials 142 and 143 is adjusted in advance. Therefore, the respective temperatures of the covering materials 142 and 143 placed in contact with the material 200 can be made to more closely match.

The material 200, which is not directly supplied to the covering materials 142 and 143, is transported to the covering materials 142 and 143 facing each other with a space therebetween after being supplied to the first transporter 120. Therefore, the material 200 can be melted using any of a variety of methods or configurations and arranged in a state in which the covering materials 142 and 143 are easily placed into contact thereto. There is a high degree of design freedom. In addition, the covering materials 142 and 143 may be arranged with a set interval therebetween, irrespective of the supply configuration of the material 200, so there is a high degree of design freedom.

The first transporter 120 that transports the material 200 and the second transporter 130 that transports the covering materials 142 and 143 can be made to transport at rates independent of the other. Therefore, the transport rates of the first transporter 120 and the second transporter 130 can be adjusted irrespective of the supply rate of the material supplier 110. Thus, the amount of material 200 supplied per unit time can be adjusted. Formed products of a variety of shapes and thickness may therefore be easily manufactured.

The covering materials 142 and 143 are laminated on the material 200 to create a laminate. Therefore, the laminate 205 may be formed at the same time the resin formation product comprising the material 200 is manufactured. Therefore, the laminate may be efficiently manufactured in fewer steps. The covering materials 142 and 143 are affixed to the material 200 with the latter in a melted or softened state, so the resin formation product comprising the material 200 is not reheated. Consequently, warping or distortion due to the effects of contraction following reheating are avoided.

If the laminate 205 is manufactured with the manufacturing device 100, the second transporter 130 is not required to include the conveyer belt 132. In other words, the second transporter 130 could be configured with a driven roller or a guide roller that directly transports the covering materials 142 and 143. In addition, the covering materials 142 and 143 may be made of different materials. For example, one could be a laminate that is laminated to the material 200 while the other could be a detachable item that is detached from the material 200. Moreover, at least one of the covering materials 142 and 143 may be omitted.

A configuration in which a single-layer synthetic resin product consisting only of the material 200 will be discussed next. In this case, the covering materials 142 and 143 are not used, so the conveyer belts 132 of the second transporter 130 becomes the surface of contact with the material to be formed, making direct contact therewith. The conveyer belts 132, like the conveyer belt 122 of the first transporter 120, has a high detachability from the formation product 200, being a synthetic resin or rubber material with a surface to which a fluorine resin layer has been applied or a steel belt with a treated surface.

This manufacturing method is similar to the above described method, except for the fact that the covering materials 142 and 143 are used as the conveyer belt 132. When the material 200 is sent from the rear end of the formation means 160, the material 200 detaches from both sides of the conveyer belts 132.

The conveyer belts 132 make contact with the material 200 simultaneously and at an identical temperature. Therefore, the difference in the contraction rates of the two sides of the layer of the material 200 following formation and cooling is small, and a formed product lacking warping or distortion is obtained. A single-layer formed product is manufactured that does not use a separate detaching object, so a supplier for the contact surface is not needed, and the manufacturing device may be downscaled. In addition, the conveyer belts, serving as detaching objects, are repeatedly used, so resources are effectively conserved, and the price is lowered.

The resin product formed using material 200 is not limited to having a planar shape and may have any of a variety of shapes. For example, the material 200 can be bent using the means for bend formation 190 shown in FIGS. 7 and 8. The means for bend formation 190 may be used to replace the cooling means 170 of the manufacturing device 100.

Figure 7:
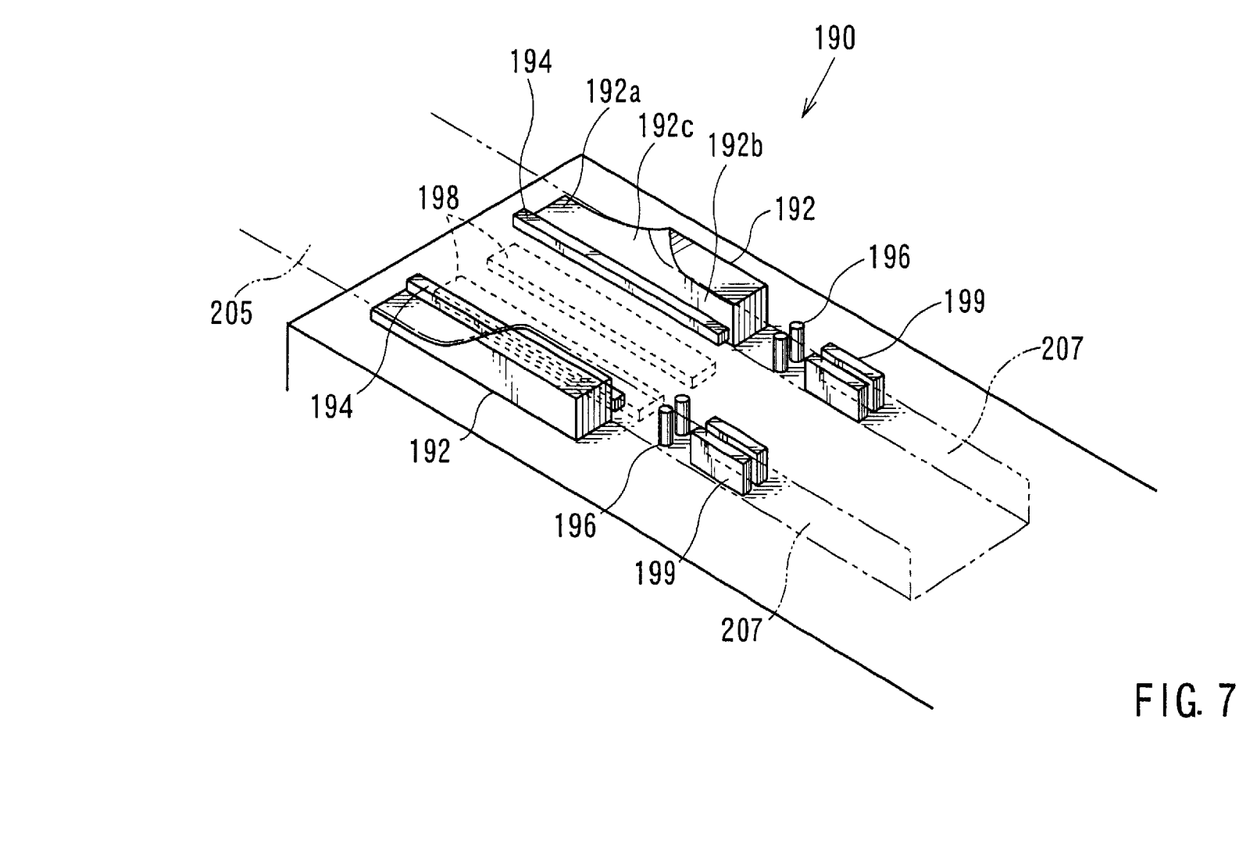
FIG. 7 is a perspective view showing the bending means 190 shown in FIG. 5.
Figure 8:
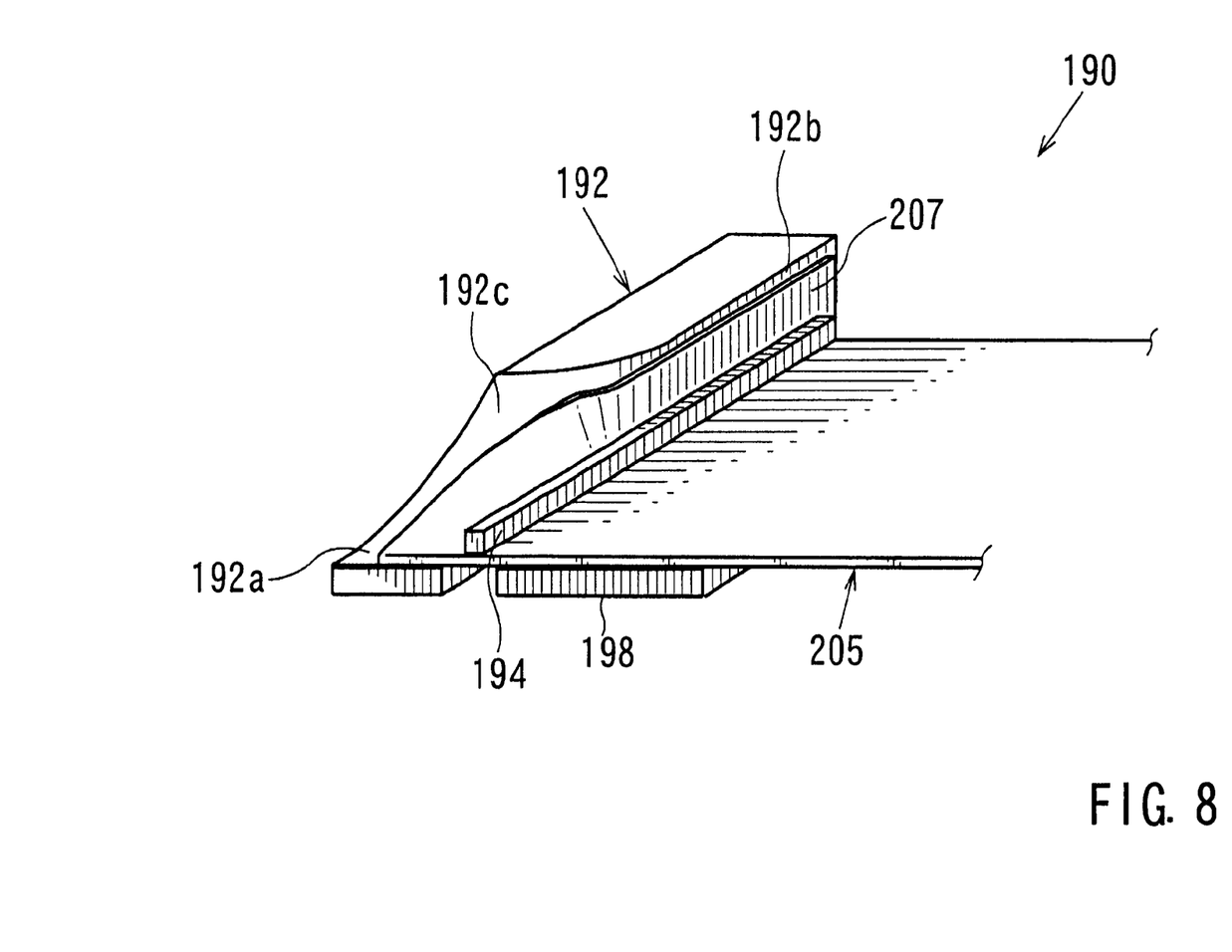
FIG. 8 is an expanded view of a portion of FIG. 7.

The means for bend formation 190 comprises a bending and lifting member 192 and a suppressing member 194 positioned on the transport route on both sides of the laminate 205 (or the single-layer formed product) as well as a pressure roller 196 for raised part formation. The bending and lifting member 192 gradually bends up and raises both surfaces of the planar laminate 205. The bending and lifting member 192 has a base surface 192*a* that makes contact with the bottom surface of the planar laminate 205 and a raising surface 192*b* that makes contact with the outer surface of the raised part of the laminate 205 after it has been bent. A bending and raising surface 192*c* formed so that the two surfaces are connected by a gradual curve is provided between the base surface 192*a* and the raising surface 192*b*. The bending and raising member 192 is positioned so that the laminate 205 being transferred moves from the base surface 192*a* to the raising surface 192*b*.

The suppressing member 194 prevents the central portion of the laminate 205 from also being formed into a curved surface when the two surfaces are raised by the bending and raising member 192. The suppressing member 194 is an elongated part with a length similar to the length of the bending and raising member 192 and is positioned on the inside of the bending and raising member 192 adjacent to said member 194. The suppression member 194 is disposed on the upper surface of the laminate 205, and the outer surface on the outside of the suppression member 194 is positioned so as to make contact with the bent portion of the laminate 205. The suppression member 194 preferably has a roller that rotates in the direction in which the laminate 205 proceeds.

The pressure roller 196 is located downstream of the bending and raising member 192 and the suppressing member 194. The pressure roller 196 sandwiches the inner and outer surfaces of a raised part 207 formed by the bending and raising member 192 and the suppressing member 194 and has a certain thickness.

The bend formation means 190 is provided as a unit with the cooling means 170. More specifically, a cooling bar 198 similar to the cooling means 170 is provided at the portion that touches the center of the laminate 205 from below. In addition, a pair of cooling bars 199 that touch the inner and outer surfaces of the raised part 207 are provided beyond the pressure roller 196.

If a bent formed product is to be manufactured, the material 200 must have a softness that is adequate to allow bending during bend formation. The laminate 205 is formed at a certain thickness without cooling water being passed through the pressure roller 166 in the formation means 160.

Next, the laminate 205 is transported to the bend formation means 190 via the second transporter 130. The laminate 205 is transported so that it traverses the upper side of the bending and raising member 192 of the bend formation means 190 and the lower side of the suppression member 194. The laminate 205 passes from the base surface 192a of the bending and raising member 192 over the bending and raising surface 192c and is bent up as it is transported. At this time, the suppression member 194 pressed on the upper surface of the laminate 205 to prevent the upper surface of the laminate 205 from rising into a bent conformation. Once the laminate 205 is transported to the raising surface 192b, the sides are bent at a 90° angle relative to the central portion, and the raised part 207 is formed. The raised part 207 is formed at a certain thickness by the pressure roller 196 located beyond the bending and raising member 192.

At the bend formation means 190, the cooling bar 198 is put into contact with the middle of the lower surface of the laminate 205 as the sides are bend up, and the laminate 205 is cooled. After being formed by the pressure roller 196, the raised part 207 is put into contact on both raised surfaces with the cooling bars 199 and cooled. Due to this cooling, the laminate 205 is hardened and becomes an elongated, bent product, or a U-shaped formed product with a certain groove depth. It is then cut to a certain length by the cutting means 180 as was described above, and the bent formed product is thus manufactured.

In this manufacturing method, the laminate 205 may be formed as the material 200 is pressed into a plate-like conformation and then given a certain bent formation. The bend formation means 190, with the bending and raising member 192 and the suppression member 194 alone, uses the transportation means of the formed product manufacturing device to easily and reliably bend the product. Therefore, a bent product may be efficiently produced with a limited number of steps.

After the material 200 supplied in a softened state is formed at a certain thickness, it is bent without being cooled, so that warping and distortion do not readily occur. The manufacturing device does not require a means for heating for the bend formation.

The bent formed product is not limited to the laminate 205, and the material 200 may obviously be manufactured as an elongated formed product of a single layer. Bending may be performed to provide a variety of bends at a number of positions on the formed product.

The cooling means 170 and the bend formation means 190 may be arranged in this order to obtain a formed product manufacturing device capable of manufacturing both planar formed products and bent formed products according to whether or not either of these means are activated.

What is claimed is:

1. A method for manufacturing a resin laminate comprising:

mixing a granular ground plant product into a melted resin material, thereby obtaining a melted resin substance;

extruding the incited resin substance as a plate-shaped intermediate resin layer between a pair of spaced apart extraction rollers;

superimposing surface resin layers on both surfaces of the intermediate resin layer;

pressing the surface resin layers using a pressing member, thereby adhering tire surface resin layers to both sides of the intermediate resin layer; and cooling and hardening the surface resin layers and the intermediate resin layer, thereby producing the resin laminate in which the surface resin layers are joined to both surfaces of the intermediate resin layer.

2. A method for manufacturing a resin laminate according to claim 1, wherein the granular plant product is mixed into the melted resin material using a stirring member, the resin material is melted due to frictional heat produced by stirring the stirring member, and the melted resin material is made porous by stirring the stirring member and introducing air bubbles into the melted resin material.

3. A method for manufacturing a resin laminate according to claim 1, further comprising mixing a foaming agent into the melted resin, wherein the melted resin is made porous due to the foaming action of the foaming agent.

4. A method for manufacturing a resin laminate according to claim 1, wherein a pair of coaled press members cools and hardens the resin laminate.

5. A method for manufacturing a resin laminate according to claim 1, wherein in the extruding step, a plurality of concave grooves extend axially along the outer circumferences of extraction rollers, and the melted resin is extruded via the extraction rollers.

6. A method for manufacturing a resin laminate according claim 1, further comprising heating the surface resin layer before superimposing the heated surface resin layer onto the melted resin.

7. A method for manufacturing a resin laminate according to claim 1, further comprising forming a groove on at least one surface of the resin laminate by pressing a protrusion on the pressing member against the surface resin layer.

8. A method for manufacturing a resin laminate according to claim 1, wherein the ground plant product substantially comprises kenaf.

9. A method for manufacturing a resin laminate according to claim 1, wherein the resin material substantially comprises recycled resin material.

10. A method for manufacturing a resin laminate according to claim 1 further comprising:

adjusting the temperature of the surface resin layers so that both surfaces of the melted resin are at substantially the same temperature.

11. A method for manufacturing a resin laminate according to claim 10, wherein the surface resin layers are simultaneously set to the same temperature.

12. A method for manufacturing a resin laminate according to claim 10, further comprising bending the resin laminate in a softened state after pressing.

13. A method for manufacturing a resin laminate according to claim 10, wherein the melted resin further comprises kenaf.

14. A method for manufacturing a resin laminate according to claim 10, wherein the melted resin comprises recycled resin.

15. A method for manufacturing a resin laminate according to claim 1, wherein in the extruding step, the extraction rollers are adapted to rotate around lateral axes that are disposed in parallel.

16. A method for manufacturing a resin laminate according to claim 1, wherein in the extruding step, the melted resin is extruded via an outlet port having a width that is adjusted to be slightly larger than the optimum post-formation thickness of the intermediate resin layer.

17. A method for manufacturing a resin laminate according to claim 15, wherein in the extruding step, the melted resin is extruded via an outlet port having a width that is adjusted to be slightly larger than the optimum post-formation thickness of the intermediate resin layer.

18. A device for manufacturing a resin laminate comprising:

a supply of granular ground plant product;

a first means for mixing a melted resin with the granular ground plant product to produce a melted resin substance;

a second means for extruding the melted resin as a plate-shaped intermediate resin layer between a pair of spaced apart extraction rollers;

a third means for superimposing surface resin layers on both surfaces of the intermediate resin layer; and a fourth means for pressing the surface resin layers via a pressing member, adhering the surface resin layers to the intermediate resin layer, and cooling and hardening these layers in order to produce the resin laminate in which the surface resin layers are joined to both surfaces of the intermediate resin layer.

19. A device for manufacturing a resin laminate according to claim 18, wherein the first means further comprises means for mixing a foaming agent into the melted resin.

20. A device for manufacturing a resin laminate according to claim 18, further comprising a fifth means for cooling the resin laminate produced by the fourth means, the fifth means comprising a pair of cooled press members.

21. A device for manufacturing a resin laminate according to claim 18, wherein the third means comprises a means for heating the surface resin layer before it is superimposed on the melted resin.

22. A device for manufacturing a resin laminate according to claim 18 further comprising:

means for adjusting the temperature of the surface resin layers so that both surfaces of the melted resin are at substantially the same temperature.

23. A device for manufacturing a resin laminate according to claim 22, further comprising means for simultaneously adjusting the surface resin layers to the same temperature.

24. A device for manufacturing a resin laminate according to claim 22, further comprising means for bending the resin laminate after pressing.

* * * * *